United States Patent [19]
Holloway

[11] Patent Number: 5,979,752
[45] Date of Patent: Nov. 9, 1999

[54] PORTABLE AND FLOATABLE FISH WEIGHT TABULATION PEG BOARD AND METHOD FOR USING SAME DURING COMPETITION

[76] Inventor: Steven M. Holloway, 1488 Oak Spring Dr., Marietta, Ga. 30066

[21] Appl. No.: 08/917,246

[22] Filed: Aug. 25, 1997

[51] Int. Cl.⁶ ................................................. A63F 1/18
[52] U.S. Cl. .............................. 235/90; 273/282.1; 43/4; 116/325
[58] Field of Search .................... 235/90, 85 R; 273/282.1, 148 A; 43/4; 116/307, 325, 326

[56] References Cited

U.S. PATENT DOCUMENTS

| | | | |
|---|---|---|---|
| 4,068,972 | 1/1978 | Stuart | 235/90 |
| 4,660,666 | 4/1987 | Reder et al. | 177/148 |
| 4,721,174 | 1/1988 | Letzo | 177/225 |
| 4,753,031 | 6/1988 | Owen | 43/54.1 |
| 4,765,420 | 8/1988 | Mengo | 177/147 |
| 4,970,988 | 11/1990 | Heisey | 119/3 |
| 4,995,188 | 2/1991 | Ewing | 43/23 |
| 5,031,710 | 7/1991 | Parker et al. | 177/210 FP |
| 5,388,547 | 2/1995 | Lehr et al. | 235/90 |
| 5,491,324 | 2/1996 | Vanderpool | 235/90 |
| 5,545,855 | 8/1996 | Stanfield et al. | 177/25.13 |

*Primary Examiner*—Michael G Lee
*Assistant Examiner*—Diane I. Lee
*Attorney, Agent, or Firm*—William B. Noll

[57] ABSTRACT

Invention relates to an accurate, yet inexpensive system for recording and maintaining the weight of fish caught during a fishing competition, where the object is to catch and retain a predetermined number of fish, of the highest weight, within a prescribed time limit. The system utilizes a lightweight, weather proof board having color coded indicia thereon, and pegs for quickly recording the weight of a fish, where such system cooperates with a live well using color coded floaters, and that a given floater is assigned to a selected fish. The system allows for easy culling when the predetermined limit of fish is exceeded.

7 Claims, 1 Drawing Sheet

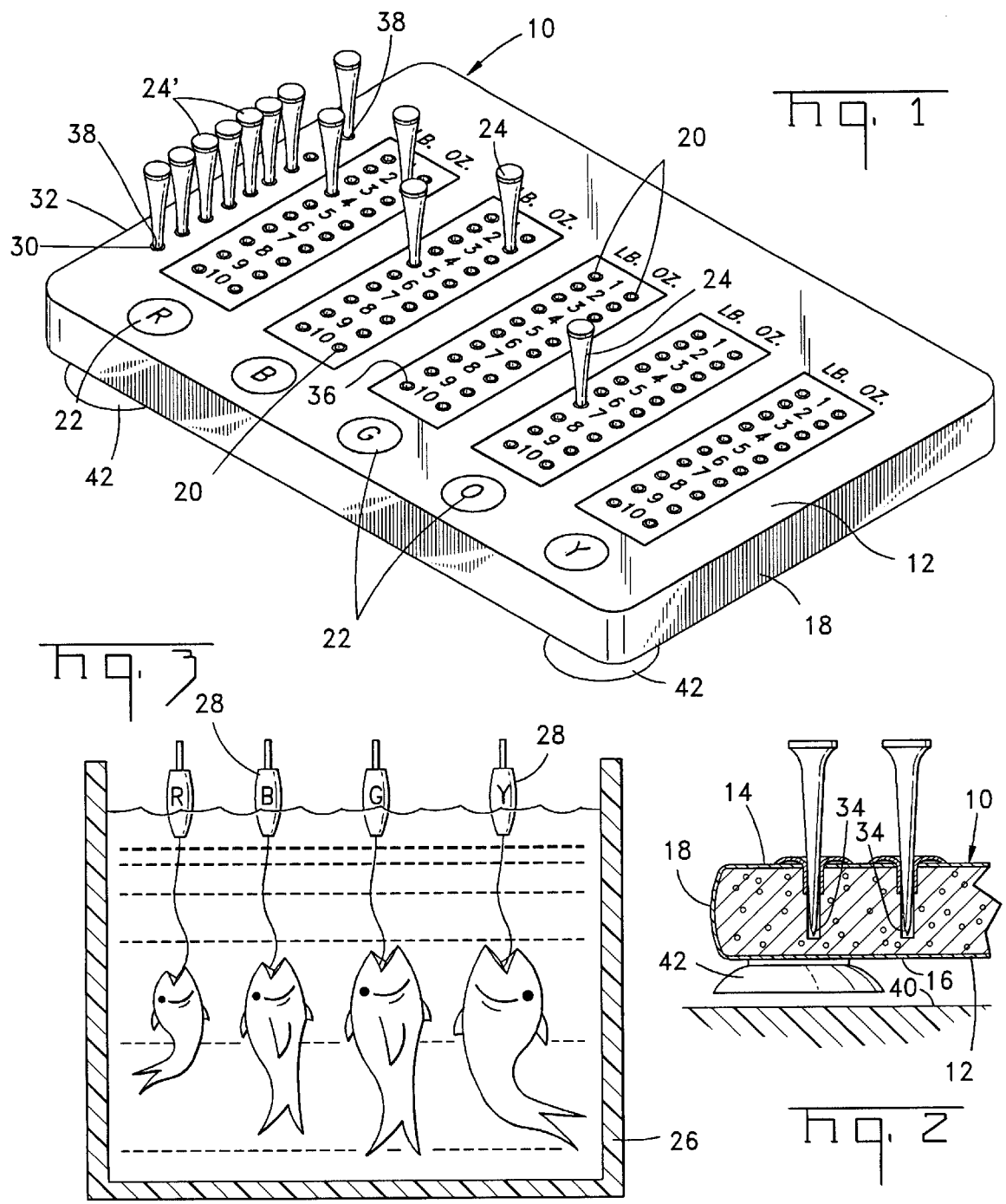

PORTABLE AND FLOATABLE FISH WEIGHT TABULATION PEG BOARD AND METHOD FOR USING SAME DURING COMPETITION

FIELD OF THE INVENTION

This invention relates to the field of fishing accessories, for use by competitive fishermen, where there is a need to maintain accurate and up to the minute results of the fish caught during a competition.

BACKGROUND OF THE INVENTION

The present invention is directed to an accurate, yet inexpensive, portable fish weight tabulation board, and to the method of utilizing same in a competitive atmosphere. Such device is a particularly valuable tool to a competitive fisherman, where accuracy of a catch and time are critical.

The sport of competitive fishing has experienced significant growth in recent years. Competitive tournaments with substantial prizes are being held throughout the country. The number of participants grows each year and the public interest has grown accordingly. Due to increased interest by sponsors, the size of prizes available to the winners of the competitions has grown similarly. The basis of competitive fishing is to recognize the fisherman obtaining the highest gross weight of a catch consisting of a predetermined number of fish within a stated period. The gross total weight is computed from the predetermined number of fish established by the rules, five to ten typically define such number. Thus, the competitive fisherman is continually concerned with culling fish from the catch in his live well and retaining only the heaviest fish caught. As time goes on, the fisherman is continuing to add to his catch.

As the fish are reeled in, the fisherman typically uses a scale to weigh each fish and record the weight coupled with assigning a corresponding color code to each fish. Then, he attaches the appropriate colored tag and places the tagged fish in a live well. When the predetermined number is reached, the competitive fisherman must quickly determine whether any newly caught fish should be substituted for a previously caught fish or returned to the water to grow, or hopefully be caught by a competitor. That is, once the predetermined number is reached it is necessary for the fisherman, upon any new catches, to cull the lightest fish from the catch.

There are complex and expensive devices described in the prior art, as exemplified by the following patents, that may be of benefit to a competitive fishermen:

a) U.S. Pat. No. 5,545,855, to Stanfield et al., relates to an electronic scale and display device for weighing, coding and sequentially displaying data from a plurality of individually weighed fish, caught in a fishing competition, for example. The device includes a weighing circuit having a transducer which generates an electric signal in response to and indicative of an applied weight;

b) U.S. Pat. No. 5,031,710, to Parker et al., relates to an electronic fish scale including a spring means and a variable resistor for displaying and storing the weight of a fish;

c) U.S. Pat. No. 4,995,188, to Ewing, relates to a fishing rod including means in the handle thereof for measuring the length of a fish caught, and for weighing the fish;

d) U.S. Pat. No. 4,721,174, to Letzo, relates to a light-duty fish weight scale connectable to a fishing rod, for example; and, e) U.S. Pat. No. 4,660,666, to Reder et al., relates to a portable, electronic fish scale.

The present invention is intended to provide the fisherman with an up to the minute reading on the predetermined number of heaviest fish caught, and to readily cull the lightest one with each new catch, all with an inexpensive and weather proof system. The manner by which this may be achieved will be apparent to those skilled in the art from the following description, particularly when read in conjunction with the accompanying drawings.

SUMMARY OF THE INVENTION

Invention is directed to apparatus, and to the method for tabulating and maintaining an up to the minute record of the weight of a predetermined number of fish caught within a prescribed time during a fishing competition, where the object thereof is to catch and retain the fish of the greatest weight, while culling the lightest fish when the catch exceeds the predetermined number. The invention consists in identifying each fish caught by a particular color code, where such fish is to be temporarily maintained in a live well by a floater bearing the color code. Thereafter, weighing and recording the weight on a tabulation peg-board containing indicia having the color code associated with the indicia. The board itself consists of a floatable planar member, preferably including a weather proof coating, such as plastic, thereabout with the indicia thereon. The board includes plural dual-rows of peg receiving recesses, where each pair of dual-rows has an identifying color code. With each new fish caught it is quickly identified and weighed, with the weight thereof tabulated in the appropriate dual-row of recesses, such as by pegs. With the fish duly identified by a comparably color coded floater, and maintained in a live well, as the number of fish exceeds the predetermined number, it is necessary for the fisherman to initially cull the catch. By an instant review of the board tabulations, the fisherman can quickly determine and release the lowest weight fish. The procedure continues with each new fish caught, such that at the conclusion of the prescribed time, the fisherman has retained only the fish of the greatest weight.

Accordingly, an object of the invention is to present a quick and efficient system to aid the competitive fisherman, and to maximize his time in snaring the best catch of the competition.

A further object hereof is to provide an inexpensive system for a fisherman to quickly tabulate and maintain a weight count of the fish caught, and to do so without concern for the weather or inadvertant splashing that may result.

These and other objects will become apparent to the ardent fisherman from reading the following specification.

BRIEF DESCRIPTION OF DRAWINGS

FIG. 1 is a perspective view of the portable competition weight tabulation board for a fishing event according to this invention, illustrating five arrays for recording weights of five fish.

FIG. 2 is a partial sectional view of the board of FIG. 1, further illustrating a preferred fastening means to removably secure said board to an underlying planar surface.

FIG. 3 is a simplified sectional view of a live well, as known in the art, for temporarily retaining a catch of fish, where each fish is suspended on a fishing line connected to an identifying color coded floater.

DETAILED DESCRIPTION OF PREFERRED EMBODIMENT

The present invention is directed to a low-cost, portable weight tabulation board that has particular utility in recording and maintaining the weight of fish caught during a competitive fishing event, where the object thereof is to catch a maximum number of fish during a prescribed time limit. However, there is no limit on the number of fish that eventually may be caught, so a convenient and reliable system must be available to the fisherman to allow him to quickly determine the fish to be retained, and the fish to cull, thereby allowing him to maximize the time at fishing. The present invention allows him to achieve the desired goals.

FIGS. 1 and 2 illustrate the portable weight tabulation board hereof, where like reference numerals represent comparable components or features throughout the different views. The board 10 comprises a generally light-weight rectangular member, such as made of "Styrofoam", having a coating 12, or layer of water impervious plastic thereabout. The board includes first and second major surfaces 14, 16 between a peripheral upstanding wall 18. The upper or first major surface 14 includes printed or screened indicia, as later described, to precisely identify the weights of fish caught, and which fish are to be culled from the catch.

In the exemplary embodiment illustrated, up to five fish may be identified and recorded. However, it will be apparent, depending on the rules of the fishing competition, that the board may be provided with further or additional indicia for a greater number of fish. In any case, the board 10 includes plural dual-rows of recesses 20, where a first said row may designate whole weight increments, such as "pounds", and a second said row may designate weight fractions, such as "ounces". Each said pair of dual-rows is further identified by a particular color code indicia 22, which may be a different colored dot, or colored letter, for example, such as R=red, B=blue, Y=yellow, O=orange, or G=green. As a fish is caught, it is weighed and the weight recorded on the board by inserting tapered peg-like members 24, for example, into the proper recesses, i.e., 5-pounds, 2-ounces, in a designated color coded area If the fisherman is so successful as to catch a single fish that exceeds the indicia scale available, the use of two peg-like devices may be used, i.e., 12 pounds is simply 10 plus 2. The fish then is suspended in a live well 26 (FIG. 3), as known in the art, on a fishing line and floater 28, where such floater includes the color code assigned to this particular fish. The procedure is continued with each new fish caught, where a different color code, or unused color code, is assigned to each new fish. As the predetermined number of fish is initially exceeded, as set by the competition rules, decision time is at hand. But with the board of this invention, the culling process may be quickly acomplished by releasing the lightest fish of the catch.

To make the recording of weights easily, a plurality of pegs 24' may be stored along a row of recesses 30 positioned along one edge 32 of the board. The peg-like devices to be used herein may optionally be color coded, if desired. However, in any case, such peg-like devices may be in the nature of a golf tee, where one end 34 is tapered for insertion into the board 10. For appearance, and to provide stability to the respective recess openings 36, such openings may each be provided with a metal eyelet 38, such as made from polished brass, or a rubberized grommet, where the latter offers the advantage of a yieldable element that provides some compressive or retentive force to the contained peg-like device.

Since the board 10 is portable and light-weight, a convenient means is provided for placing and temporarily securing the board to an underlying planar surface 40, such as the ever present "cooler" that accompanies a fisherman on his fishing trip, where a preferred manner of securing is by the use of suction cups 42 placed about the periphery of the lower or second surface 16.

In the practice of the method of this invention, utilizing the board 10 of FIGS. 1 and 2, each fish, as caught, is identified by a color code, and weighed. The weight thereof is quickly recorded in the area designated by the color code, and the fish is placed into a live well 26, where it is suspended by a floater of the particular color code. The fish catching is continued until each of the predetermined number of color coded areas are duly identified with the weight of a selected fish.

With fishing time remaining in the prescribed time, new fish are caught. Quickly weighing such fish, and reviewing the tabulations on the board, the fisherman can readily determine the lightest fish of the catch, and release same back into the water to rejoin his friends, and hopefully be caught by a competitor. With each new fish added to the catch, the culling process is quick and easy, allowing the fisherman to retain only the predetermined limit of fish having the greatest weight.

I claim:

1. A portable and floatable weight tabulation board for recording weights of fish caught during competition, where an object of the competition is to catch and retain only the heaviest fish up to a predetermined number of fish, said board comprising a lightweight, generally rectangular, floatable member having first and second major surfaces, said board including a water-resistant coating;
   a) said coating along said first major surface including a plurality of different identifying indicia along a first edge thereof,
      i) a row of recesses along a second edge for removably receiving a series of peg members, and
      ii) an array of dual row recesses, one for each said different identifying indicia, where one row thereof designates weight increments, and a second row designates weight fractions; and
   b) said second major coated surface including attachment means for removably securing said board to a supporting planar surface.

2. The portable and floatable weight tabulation board according to claim 1, wherein said floatable member is a from material having a coating of plastic thereabout.

3. The portable and floatable weight tabulation board according to claim 2, wherein said attachment means are plural suction cups arranged in close proximity to the periphery of said coated second major surface.

4. The portable and floatable weight tabulation board according to claim 1, wherein said weight increments are sequential numbers to identify pounds, and said weight fractions are sequential numbers to identify ounces.

5. The portable and floatable weight tabulation board according to claim 1, wherein each said different identifying indicia has a comparable floater element associated with a specific fish retained in a live well.

6. The portable and floatable weight tabulation board according to claim 1, wherein the coating surface opening of each said recess includes a metal eyelet to define said recess.

7. The portable and floatable weight tabulation board according to claim 1, wherein the coating surface opening of each said recess includes a rubberized grommet to define said recess.

* * * * *